Patented Sept. 5, 1933

1,925,672

UNITED STATES PATENT OFFICE 1,925,672

CORROSION INHIBITING COMPOUND

Anthony A. Oeding, Ferguson, Mo.

No Drawing. Application September 25, 1931.
Serial No. 565,206

2 Claims. (Cl. 252—5)

This invention relates generally to corrosion inhibiting compounds and has for its prime object the provision of a composition for use in aqueous solutions adapted especially, though not exclusively, for preventing the formation of corrosion and rust in the radiators, engine-water-jackets, and other water-passages of automotive vehicles and the like.

My invention has for another object the provision of a composition of the character described in aqueous solution for the purposes set forth.

My invention has for its further objects the provision of a compound of the character described prepared in a stable, readily-usable form for consumer use, which may with ease and facility be employed even by those most inexperienced in its use, which has a period of usefulness measured in years, which will not harm or damage metal or rubber, and which may successfully be employed for its intended purpose in water-containing thermal-regulating systems of any degree of temperature.

And with the above and other objects in view, my invention resides in the provision of a novel compound or composition of matter, and in the employment thereof as a corrosion and rust inhibiting agent or agents, as hereinafter described and pointed out in the claims.

My new product consists of the following ingredients or constituents in approximately the proportions stated, namely, 5 percent of liquid bark-extract of about 42° Bé gravity, 20% yellow chromate of soda, 15% pale paraffin oil of between 150 and 200 Seybolt seconds viscosity, 50% sulphonated red-oil, 2% liquid soap, and 8% water.

The several ingredients are intimately mixed in approximately the proportions stated, the resulting product being a saponified liquid or emulsion-like product and is available for use immediately after being thus prepared.

The tannin-bearing bark extract is employed, among other purposes, for its tannic-acid content, which I have found most efficacious as a water-softener.

The sodium-chromate and paraffin oil are employed with the other ingredients to obtain the desired physical properties of the solution, for providing or regulating the requisite specific heat and surface tension of the circulating or engine-cooling water in which the preparation may be used, for preventing boiling and foaming thereof, and for providing the proper conditions for the efficacious action of the preparation.

The sulphonated red-oil is employed for depressing the ionization of the soluble mineral salts present in the engine cooling water which, unless inhibited from such action, cause electrolytic action resulting in corrosion and rust-formation. The soap is employed as a saponifying agent for stabilizing the product, the water being used merely as a diluent.

The respective proportions of the several ingredients of the preparation are substantially critical and were arrived at after long experimentation to ascertain the necessary mixture to take care of heat transfer and foaming, that is to say, the specific heat and surface tension must be adjusted, and in use, the compound is preferably employed in the proportions of approximately five ounces, or about one third of a pint, to twelve quarts of water, which suffices for treating the cooling system of, for example, a Ford "Model A" automobile. Cooling systems of other automobiles will require more or less of the compound proportionately to their water-content.

When the compound is first mixed with the cooling-water in the radiator, the solution will become of a cloudy or milky color, which cloudiness, however, will disappear after two or three months use, and in any event does not affect the efficacy of the treated water for engine-cooling purposes.

For most effective results, the compound is introduced into the cooling-system water when the car is new, the solution being effective for its intended purpose for from two to three years thereafter. Thus employed, the compound is highly effective for preventing electrolytic action resulting in rusting of the radiator, stoppage of the overflow pipe thereof, rotting of the hose-connections, wear of the water pump due to rust or scale formation, and loss of cooling efficiency due to rust and scale in the water jackets, and other like benefits and advantages will be obtained over a relatively long period of time.

The compound is harmless to metal or rubber and, when the ingredients are combined in the proportions described, has substantially little or no effect on the temperature of the motor nor the proper functioning of the cooling system. For winter driving, the compound may most successfully be employed with anti-freezing solutions containing alcohol or glycerine, preferably the former. I might add that the successful use of the compound is not affected by the temperature of the solution.

In practice, I have found that the use of my compound will substantially prevent and inhibit the formation of rust and scale in the cooling solutions of automobile radiators, engine-water-jackets, the hose connections therebetween, and the like; however, the compound may also most advantageously be employed in aqueous solutions in boilers, ice machines, and like cooling or heating systems.

It will be understood that, if desired, the composition may be also prepared in aqueous solution for consumer use, and that the proportion of water stated may be varied as may best serve the purpose of supplying the consumer with a product suitable for its intended purposes.

Having thus described my invention, what I claim and desire to secure by Letters Patent is,—

1. A rust and scale inhibiting compound consisting of yellow sodium-chromate, pale paraffin oil of between 150 and 200 Seybolt seconds viscosity, sulphonated red oil, a liquid soap, and water, intimately mixed together in approximately the following proportions, by weight, namely, twenty pounds yellow sodium chromate, fifteen pounds pale paraffin oil, fifty pounds sulphonated red oil, two pounds liquid soap, and eight pounds of water.

2. A corrosion and rust inhibiting preparation consisting of the compound described in claim 1 mixed with and in aqueous solution for the purpose specified.

ANTHONY A. OEDING.